Patented Oct. 2, 1934

1,975,734

UNITED STATES PATENT OFFICE 1,975,734

RUBBER COMPOSITION AND METHOD OF PRESERVING RUBBER

Waldo L. Semon, Silver Lake Village, Ohio, assignor to The B. F. Goodrich Company, New York, N. Y., a corporation of New York No Drawing. Application October 24, 1932, Serial No. 639,304

20 Claims. (Cl. 18—50)

This invention relates to the art of rubber manufacture, and particularly to the preservation of rubber against the deterioration which it normally undergoes, especially when exposed to light, heat or air.

An object of this invention accordingly is to provide a composition capable of inhibiting or retarding the deterioration of rubber. A further object is to retard or prevent the failure of rubber subjected to rapidly repeated strains. Another object is to provide a composition capable of accomplishing the above-named objects which may be readily and uniformly incorporated into rubber.

This invention, in brief, consists in treating rubber with a diarylamine which is activated in its rubber antioxidant properties by a diaryl p-phenylene diamine. Preferably the two substances are intimately mixed before they are incorporated with the rubber and this admixture may be effected in any well known manner, especially satisfactory results being obtained by fusing the two substances together as is more fully hereinafter set forth.

The diarylamine used as one component of the composition may be diphenylamine, phenyl-tolylamine (ortho, meta or para), phenyl-xylylamine, phenyl-cumylamine, phenyl-cymylamine, phenyl-amino-biphenyl, phenyl-naphthylamine (alpha or beta), ditolylamine, dixylylamine, dicumylamine, dinaphthylamine, tolyl-naphthylamine, etc. The diaryl p-phenylene diamine may similarly contain any of the above-mentioned aryl groups, like or unlike, or their equivalents, one aryl group being substituted on each of the amino groups of the p-phenylene diamine. The two components may be employed in various proportions, so long as a substantial proportion of each is present, but since the more costly diaryl p-phenylene diamines react to activate the diaryl amines to give an antioxidant value which is more than the additive effect of the two substances, it is preferable to employ a predominating proportion of the diarylamine and only a minor proportion of the diaryl p-phenylene diamine.

The two substances may be added to the rubber in any desired manner and sequence. It is preferred, however, to mix them together and add the mixture to the rubber before it is vulcanized. For example, if three parts of diphenylamine and one of diphenyl p-phenylene diamine, both of which are crystalline solids difficult to distribute uniformly through rubber, are melted together and allowed to cool, the mixture assumes about the consistency of a hard wax. It contains visible crystals of considerable size, but so modified by the conjoint presence of the two amines, that instead of being hard, they are very soft and readily pulverized to an impalpable mass even by the moderate degrees of pressure developed in the mixing and milling of rubber. The consequence is that the mixture is far more readily incorporated into rubber than either of its components alone to give a finer and more uniform dispersion of the antioxidant in the rubber. Since the antioxidant effect is to a considerable extent dependent on an intimate association of the antioxidant material with the rubber, the mixture prepared as described above shows an actual superiority over the same substances separately incorporated into rubber in the same proportions.

The components of the composition of this invention may, if desired, be separately prepared and purified, and then mixed in the desired proportion. On the other hand, it is frequently possible to prepare the mixture directly. For example, 372 parts by weight of aniline (4 mols), 109 parts of p-aminophenol (1 mol), 677 parts of diphenylamine (4 mols) and 10 parts of concentrated hydrochloric acid are placed in an autoclave and heated to about 260° C., the gases formed being blown off periodically, until no more water or ammonia is given off, which may require ten hours. The aniline reacts with the p-aminophenol to form diphenyl p-phenylene diamine, and also reacts with other molecules of aniline to form a further quantity of diphenylamine. The product is neutralized and the excess unreacted aniline is removed by distillation. The product consists of approximately 75% diphenylamine and 25% diphenyl p-phenylene diamine.

To illustrate the extraordinary effectiveness of the compositions of this invention in retarding the deterioration of rubber, a typical tire tread composition is prepared, containing 100 parts by weight of blended plantation rubber, 5.5 parts of sulphur, 30 parts of zinc oxide, 40 parts of gas black, 10 parts of mineral rubber, 5 parts of palm oil, and 0.75 parts of hexamethylene tetramine. This composition was divided into four parts, one of which was used as a control. To each of the three others was added 0.95 parts (0.5% of the weight of the composition) of one of the following antioxidants: pure diphenylamine, pure diphenyl p-phenylene diamine, and the mixture of 75% diphenylamine and 25% diphenyl p-phenylene diamine. The four rubber compositions were thoroughly mixed and vulcanized in a press for 45 minutes at 145° C. (294° F.) to produce an optimum cure. The relative rates of aging of the vulcanized compositions were compared by measuring their respective tensile strengths and elongations before and after aging. Accelerated aging tests were carried out in the Geer oven, in which samples were maintained at a temperature of 70° C. (158° F.) in a constantly renewed stream of air, as well as in the Bierer-Davis bomb, in which other samples were maintained at the same temperature (70° C.) in an atmosphere of oxygen at a pressure of 300 pounds per square inch. In the table below T indicates ultimate tensile strengths in pounds per square inch, and E indicates ultimate elongation in per cent. of original length.

*Accelerated aging tests*

| Antioxidant (0.5%) | Before aging | | After 7 days in the Geer oven | | After 48 hours in Bierer-Davis bomb | |
|---|---|---|---|---|---|---|
| | T | E | T | E | T | E |
| None (control) | 3660 | 660 | 2160 | 470 | 950 | 365 |
| Diphenylamine | 3780 | 645 | 2070 | 475 | 2430 | 545 |
| Diphenyl p-phenylene diamine | 3680 | 625 | 3270 | 565 | 2740 | 550 |
| Diphenylamine activated with diphenyl p-phenylene diamine | 3780 | 655 | 3260 | 550 | 2730 | 575 |

It is evident that the activated diarylamine is far more active than the average of the activities of the pure components. The mixture also possesses the property of preventing or retarding the formation of cracks in rubber subjected to rapidly repeated strains such as occur when a tire tread is flexed as it runs on the road. The durability of the rubber composition is therefore greatly increased.

This application is a continuation in part of my co-pending application Serial No. 340,338 filed February 15, 1929, now Patent No. 1,884,889.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit or scope of the invention as defined in the appended claims.

I claim:

1. The method of preserving rubber which comprises treating rubber with an anti-oxidant consisting of a preponderant proportion of a diarylamine which is activated by admixture with a minor proportion of a diaryl p-phenylene diamine.

2. The method of preserving rubber which comprises incorporating into a vulcanizable rubber composition an anti-oxidant consisting of a preponderant proportion of a diarylamine which is activated by fusion with a minor proportion of a diaryl p-phenylene diamine, and vulcanizing the product.

3. The method of preserving rubber which comprises treating rubber with an anti-oxidant consisting of a preponderant proportion of a diarylamine in which the aryl groups are selected from the benzene homologous series, activated by admixture with a minor proportion of a diaryl p-phenylene diamine.

4. The method of preserving rubber which comprises treating rubber with an anti-oxidant consisting of a preponderant proportion of a diarylamine activated by admixture with a minor proportion of a diaryl p-phenylene diamine in which the aryl groups are selected from the benzene homologous series.

5. The method of preserving rubber which comprises treating rubber with an anti-oxidant consisting of a preponderant proportion of a diarylamine activated by admixture with a minor proportion of a diaryl p-phenylene diamine, in each of which components the aryl groups are selected from the benzene homologous series.

6. The method of preserving rubber which comprises treating rubber with an anti-oxidant consisting of a preponderant proportion of diphenylamine activated by admixture with a minor proportion of diphenyl p-phenylene diamine.

7. The method of preserving rubber which comprises incorporating into a vulcanizable rubber composition an anti-oxidant consisting of a preponderant proportion of diphenylamine activated by admixture with a minor proportion of diphenyl p-phenylene diamine, and vulcanizing the product.

8. The method of preserving rubber which comprises incorporating into a vulcanizable rubber composition a mixture of a preponderant proportion of diphenylamine and a minor proportion of diphenyl p-phenylene diamine prepared by melting the two components together and cooling the fused mixture, and vulcanizing the rubber composition.

9. A rubber composition comprising rubber and an anti-oxidant consisting of a preponderant proportion of a diarylamine and a minor proportion of diaryl p-phenylene diamine.

10. A rubber composition comprising rubber and an anti-oxidant consisting of a preponderant proportion of diphenylamine, and a minor proportion of diphenyl p-phenylene diamine.

11. A vulcanized rubber composition which has been vulcanized in the presence of an anti-oxidant consisting of a preponderant proportion of a diarylamine and a minor proportion of a diaryl p-phenylene diamine.

12. A vulcanized rubber composition which has been vulcanized in the presence of diphenylamine and diphenyl p-phenylene diamine, the proportion of diphenylamine preponderating over that of diphenyl p-phenylene diamine.

13. A vulcanized rubber composition prepared by melting together a preponderant proportion of diphenylamine and a minor proportion of diphenyl p-phenylene diamine, incorporating the cooled mixture into a vulcanized rubber composition, and vulcanizing the rubber.

14. The method of preserving rubber which comprises treating rubber with an anti-oxidant consisting of a preponderant proportion of an aryl-naphthylamine and a minor proportion of a diaryl p-phenylene diamine.

15. The method of preserving rubber which comprises treating rubber with a mixture of a diaryl p-phenylene diamine in which the aryl groups are selected from the benzene homologous series, and an aryl-naphthylamine.

16. The method of preserving rubber which comprises treating rubber with a mixture of a phenyl-naphthylamine and diphenyl p-phenylene diamine.

17. The method of preserving rubber which comprises treating rubber with a mixture of phenyl-alpha-naphthylamine and diphenyl p-phenylene diamine.

18. The method of preserving rubber which comprises treating rubber with a mixture of phenyl-beta-naphthylamine and diphenyl p-phenylene diamine.

19. A rubber composition comprising rubber which has been vulcanized in the presence of an aryl-naphthylamine and a diaryl p-phenylene diamine, each of the said aryl groups being selected from the benzene homologous series.

20. A rubber composition comprising rubber and an anti-oxidant consisting of a preponderant proportion of phenyl-beta naphthylamine and a minor proportion of diphenyl p-phenylene diamine.

WALDO L. SEMON.